United States Patent [19]

Tamura et al.

[11] Patent Number: 4,776,611

[45] Date of Patent: Oct. 11, 1988

[54] AUTOMATIC SEAT BELT APPARATUS

[75] Inventors: Keiichi Tamura; Noritada Yoshitsugu; Motonobu Sugiura, all of Aichi, Japan

[73] Assignees: Kabushiki Kaisha Tokai-Rika-Denki-Seisakusho; Toyota Jidosha Kabushiki Kaisha, both of Aichi, Japan

[21] Appl. No.: 24,126

[22] Filed: Mar. 10, 1987

[30] Foreign Application Priority Data

Mar. 10, 1986 [JP] Japan .............................. 61-34016[U]

[51] Int. Cl.$^4$ ............................................. B60R 22/06
[52] U.S. Cl. ..................................... 280/804; 280/808
[58] Field of Search ............... 280/801, 802, 804, 808; 297/469

[56] References Cited

U.S. PATENT DOCUMENTS

| 4,262,932 | 4/1981 | Motonami et al. | 280/802 |
| 4,302,031 | 11/1981 | Nishimura et al. | 280/804 |
| 4,597,588 | 7/1986 | Kawai | 280/804 |
| 4,681,347 | 7/1987 | Tamura et al. | 280/804 |

FOREIGN PATENT DOCUMENTS 28552 2/1980 Japan .
55-63933 5/1980 Japan .

Primary Examiner—John J. Love
Assistant Examiner—Karin L. Ferriter
Attorney, Agent, or Firm—Sixbey, Friedman, Leedom & Ferguson

[57] ABSTRACT

An automatic seat belt apparatus capable of automatically applying a webbing around an occupant of a vehicle. This seat belt apparatus has a reinforcement member which is disposed near the end of a guide rail along which a slider is guided, the slider being accommodated in the reinforcement at the stroke end. The apparatus also has a holder at which a limit switch for detecting the stroke end of the slider is attached and which covers the reinforcement member, and an anchor pin for supporting a load caused at the time of an emergency, the holder and the anchor pin encircling the reinforcement member. The position of the anchor pin varies in accordance with the adjustment of the stroke end of the slider so as to constantly correspond to that of the slider while the webbing is being fitted around the occupant's body. At the time of an emergency, the tensile force of the webbing is positively transmitted to the body of the vehicle via the anchor pin, the holder and the reinforcement member.

21 Claims, 4 Drawing Sheets

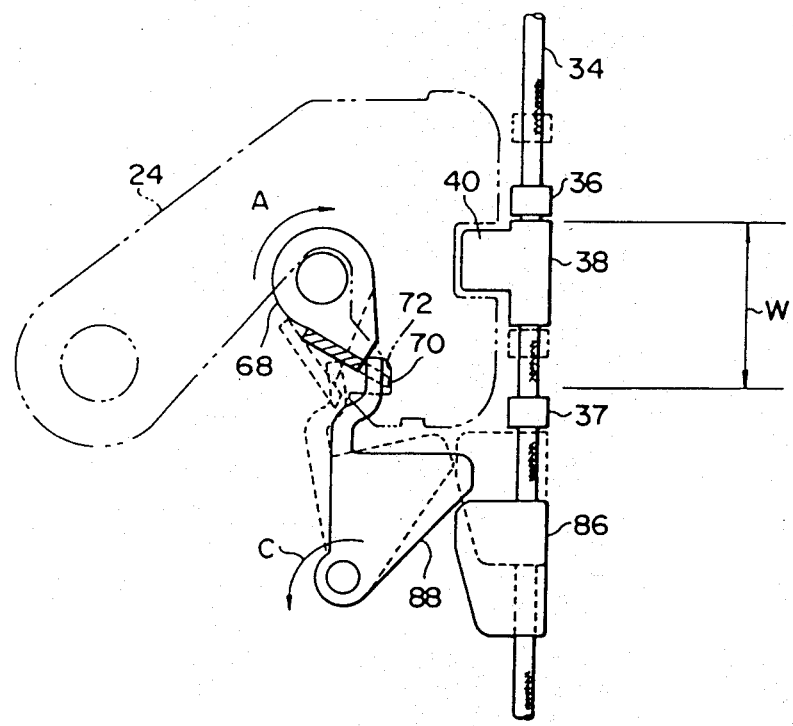

AUTOMATIC SEAT BELT APPARATUS

BACKGROUND OF THE INVENTION

1. Field of the Invention

This invention relates to an automatic seat belt apparatus in which a webbing is automatically applied around an occupant after he has seated himself, and more particularly to an automatic seat belt apparatus adapted to allow the position in which a slider stops to vary in accordance with the physique of each individual occupant.

2. Description of the Prior Art

A type of automatic seat belt apparatus in which a webbing is automatically placed around or removed from the body of an occupant has been previously disclosed (Japanese Utility Model Laid-Open No. 28552/1980). In this apparatus, one end of a webbing is wound up by a retractor disposed at the center of the vehicle and the other end is engaged with a slider which is slidable in the fore and aft direction of the vehicle along a guide rail disposed in the vicinity of a side edge of the roof of the vehicle and in which the webbing is fitted or removed by moving the slider.

When the slider is moved along the guide rail toward the front of the vehicle, sufficient space to allow the occupant to get into the vehicle is formed between the intermediate portion of the webbing and the seat. After the occupant is seated, the slider is moved toward the rear of the vehicle along the guide rail, thus fitting the webbing around the occupant's body.

The slider is stopped at a position in which the webbing is suitably applied around the occupant. This position is detected by a limit switch which acts to stop the slider. This limit switch is attached to the guide rail in a predetermined position (adapted for occupants of average physique), and therefore there is a possibility of the webbing being applied in an unsuitable state if an occupant whose physique differs from the norm enters the vehicle.

To eliminate this problem, a form of construction has been proposed in which the position at which the limit switch is attached can be varied (U.S. patent application No. 903,246 U.S. Pat. No. 4,681,347). This construction ensures that the webbing is placed in the most suitable position by allowing the position of the limit switch to be preliminarily adjusted in accordance with the physique of an individual occupant.

In this proposal, however, a holder for supporting the slider when the webbing is applied around the occupant is formed by being bent from a plate is mounted on a reinforcement member fixed to the vehicle, the opposite ends of the holder thereby bent being accommodated in grooves formed in the reinforcement member. Consequently, there is a risk of reduction in the level of the supportable load due to the deformation of the holder if the thickness of the holder is small.

SUMMARY OF THE INVENTION

In view of the above-described facts, it is an object of the present invention to provide an automatic seat belt apparatus in which tension acting on the slider is positively transmitted to the body of the vehicle even if the holder is formed from a thin plate.

To this end, the present invention provides an automatic seat belt apparatus capable of automatically applying a webbing around an occupant of a vehicle, the automatic seat belt apparatus having: a guide rail disposed along the body of the vehicle; a slider capable of sliding by being guided along the guide rail, one end of the webbing being engaged with the slider; driving means for automatically applying the webbing to the occupant or removing the webbing from the occupant, one end of the driving means being connected to the slider so as to drive the same along the guide rail; a limit switch for determining the stroke end of the slider in the vicinity of one end of the guide rail; a reinforcement member disposed in the vicinity of the end of the guide rail and fixed to the body of the vehicle, the reinforcement member accommodating the slider positioned at the stroke end; a holder adapted to cover the periphery of the reinforcement member, the holder being slidable along the reinforcement member, and the limit switch being mounted on the holder; adjusting means capable of determining the position of the holder at a plurality of points on the reinforcement member; and an anchor pin supported at its both ends on the holder to serve as a support member acting against the tensile force of the webbing applied to the slider, the anchor pin and the holder forming a closed cross-sectional configuration around the reinforcement member; wherein the anchor pin is moved by the operation of the adjusting means and constantly faces the slider at the stroke end, and wherein the tensile force of the webbing applied to the slider is positively transmitted to the reinforcement member by way of the holder.

At the time of an emergency, the load applied to the slider is transmitted to the holder via the anchor pin, and the load is then positively transmitted from the holder to the reinforcement member even if the holder is formed from a thin plate, since the holder is constructed such as to cover the reinforcement member.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIG. 4 is an enlarged illustration of a side end portion of the guide rail nearer to the rear of the vehicle.

DESCRIPTION OF THE PREFERRED EMBODIMENT

Figure 1:
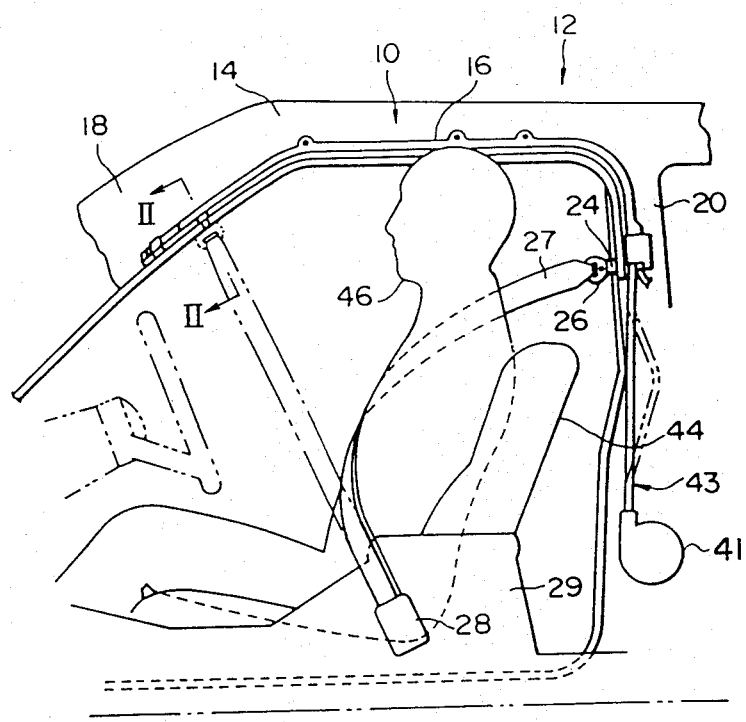
FIG. 1 is a front view of an automatic seat belt apparatus which represents an embodiment of the present invention seen from the left hand side of the vehicle.

FIG. 1 shows an automatic seat belt apparatus 10 in accordance with an embodiment of the present invention.

A guide rail 16 is disposed on a side edge 14 of the roof of a vehicle 12.

The end of the guide rail 16 which is nearer to the front of the vehicle extends along a front pillar 18 of the vehicle 12, while the other end toward the rear of the vehicle is bent generally perpendicularly to follow the line of a center pillar 20.

Figure 2:
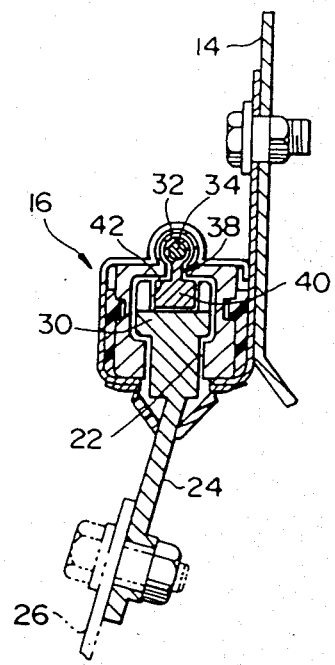
FIG. 2 is a cross-sectional view taken along a line II—II of FIG. 1.

As shown in FIG. 2, a channel 22 is formed on the underside of the guide rail 16 facing the floor of the vehicle. A slider 24 is inserted into this channel 22, and one end of a webbing 27 is attached to the slider 24 through the medium of a connection member 26.

The other end of the webbing 27 is wound on a webbing retractor 28 disposed at a central position in the vehicle so that it is accommodated in the retractor 28. The webbing retractor 28 is fixed to the body of the vehicle inside a center console 29.

In the webbing retractor 28 is incorporated an inertia lock mechanism which detects a state of emergency through an acceleration sensor, instantly inhibiting the webbing 27 from running out.

Figure 3:
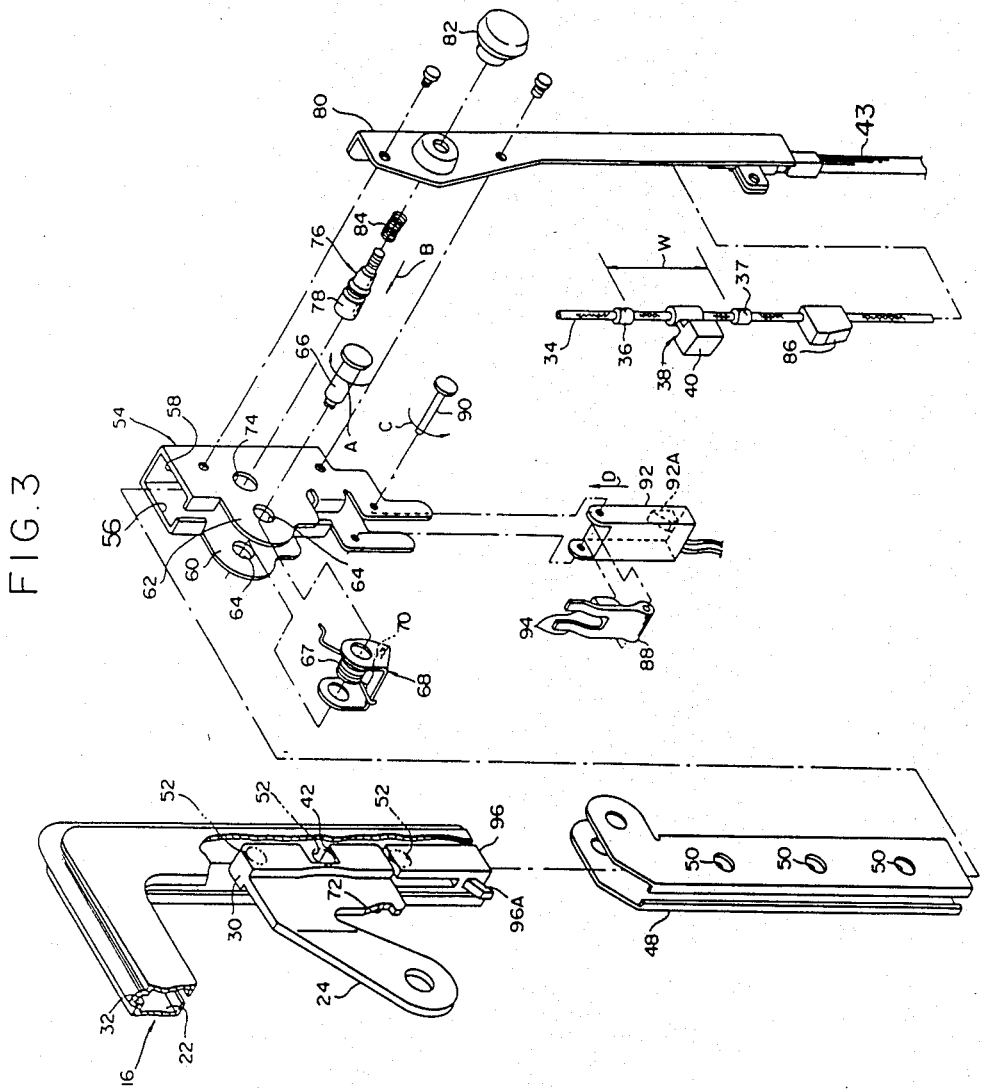
FIG. 3 is an exploded perspective view of an assembly including a guide rail and members accommodated in the guide rail.

As shown in FIGS. 2 and 3, the width of an inner part of the channel 22 of the guide rail 16 is increased so that a head 30 formed at the top of the slider 24 may be accommodated therein. A wire accommodation groove 32 is formed at the bottom of the channel 22, and an elongated member provided in the form of a wire rope 34 is disposed in this groove 22.

As shown in FIG. 3, two rings 36 and 37 are fitted around the wire rope 34 in positions corresponding to that of the slider 24 with a given dimension (W in FIG. 3) between them, and a lost motion connector 38 which constitutes a part of a connecting means is mounted around the wire rope 34 such as to be slidable between these rings.

The lost motion connector 38 has an expanded portion 40 extending toward the slider 24 and accommodated in a recessed portion 42 which is formed at the head of the slider 24. The lost motion connector 38 and this recessed portion 42 constitute the connecting means.

The rear end of the wire rope 34 is extended along the wire accommodation groove 32 in the guide rail 16, passes through a wire guide tube 43 which is disposed at the rear end of the guide rail 16 (refer to FIG. 1), and is wound up by a winding-up reel which is rotated in the clockwise and counterclockwise directions by a motor constituting a driving means 41.

When the driving means 41 rotates in the clockwise direction, a compressive force occurs in the wire rope 34 inside the wire guide tube 43, and the wire rope 34 moves along the wire accommodation groove 32 toward the front of the vehicle.

When the driving means 41 rotates in the counterclockwise direction, a tensile force occurs in the wire rope 34 inside the wire guide tube 43, thereby moving the wire rope 34 toward the rear of the vehicle.

The lost motion connector 38 attached to the wire rope 34 moves when pushed by the ring 36 or the ring 37 in such a manner that the time at which the slider 24 starts to move is slightly later than the time at which the wire rope 34 starts to move. This delay is determined by the distance between the rings 36 and 37 (the dimension W in FIG. 3).

The wire rope 34 moves in the direction toward the front of the vehicle while simultaneously pushing the slider 24 by means of the ring 37 which is nearer to the rear of the vehicle. Conversely, when the wire rope 34 moves toward the rear of the vehicle, the slider 24 is pushed by means of the ring 36.

When the slider 24 is moved along the guide rail to the end thereof that is nearer to the front of the vehicle, a space is formed between the intermediate portion of the webbing (as indicated by the chain double-dashed line in FIG. 1), thereby allowing the occupant to easily seat himself on a seat 44. When the slider is thereafter moved along the guide rail to the end thereof that is nearer to the rear of the vehicle, the webbing is suitably applied around the occupant 46.

FIGS. 3 and 4 show the state of the slider 24 when it has been moved to the rear end of the guide rail 16.

A reinforcement member 48 having a generally U-shaped cross-sectional configuration which acts as a receiving member is fitted to the outer periphery of the rear end of the guide rail 16 and is fixed to the body of the vehicle. If an emergency occurs while the slider 24 is in a position at which the webbing is suitably applied around the occupant, the load applied to the slider 24 is positively transmitted to the body of the vehicle via the reinforcement member 48.

A plurality of circular holes 50 are formed in the reinforcement member 48, and, correspondingly, the guide rail 16 is provided with circular through-holes 52 which are coaxial with the circular holes 50 in the widthwise direction of the vehicle.

A holder 54 is disposed around the outer periphery of the reinforcement member 48. The holder 54 having a generally U-shaped cross-sectional configuration is made of a metal and has leg plates 56 and 58 which are formed by being bent such as to be parallel with each other. The holder 54 is slidable along the reinforcement member 48 in the longitudinal direction thereof.

The leg plates 56 and 58 have extensions 60 and 62 at their ends and circular holes 64 are formed therein such as to be coaxial with each other.

An anchor pin 66 is disposed to pass through the circular holes 64, and a generally U-shaped pawl member 68 having a pawl 70 is axially supported on the pin 66. The pawl 70 is adapted to cooperate with a recess 72 formed in the slider 24 and constitutes, together with the recess 72, a checking means.

A torsion coil spring 67 is fitted around the pin 66 supporting the pawl member 68 to urge the pawl 68 such as to turn the pawl 70 about the pin 66 into the recess 72 (in the direction reverse to that indicated by the arrow A in FIG. 4). While the pawl 70 is within the recess 72, the slider 24 is inhibited from moving along the guide rail 16 toward the front of the vehicle. The leg plate 58 of the holder 54 has a circular hole 74 which coincides wit the circular holes 50 and 52 formed in the reinforcement member 48 and the guide rail 16, respectively, when the holder 54 slides to certain positions at suitable levels.

A large-diameter portion 78 formed at one end of a lock pin 76 serves as an adjusting means and is adapted to pass through the circular hole 74. The other end of the lock pin 76 is screwed into a knob 82 after the intermediate portion of the lock pin has passed through a tension holder 80. A compression coil spring 84 is interposed between the tension holder 80 and the large-diameter portion 78, thereby urging the lock pin 76 in the direction indicated by the arrow B in FIG. 3, that is, the direction in which the larger-diameter portion passes through the circular hole 74 of the holder 54. One end of the wire tube 43 is connected to the tension holder 80, and the other end of the wire tube 43 is connected to the driving means 41.

Accordingly, when the holder 54 is disposed in a selected position at which the circular hole 74 coincides with one of the circular holes 50 and a corresponding one of the circular holes 52, the lock pin 76 passes through these circular holes 50 and 52, thereby inhibiting the movement of the holder 54. When the knob 82 is pulled against the urging force of the compression coil spring 84 in the direction reverse to that indicated by the arrow B in FIG. 3, the lock pin 76 is pulled out of the circular holes 50 and 52 to enable the holder 54 to slide.

The tension holder 80 extends toward the floor of the vehicle, and the lower end of the tension holder 80 is fixed to the end of the wire guide tube 43 that is nearer to the vehicle roof edge. As the holder 54 moves while being followed by the tension holder 80, the wire guide tube 43 moves correspondingly.

The form of the wire guide tube 43 is linear when the lock pin 76 is positioned in the uppermost circular hole 50 of the reinforcement member 48 (refer to FIG. 1). Therefore, when the tension holder 80 is moved toward the floor of the vehicle, the wire guide tube 43 is bent and arched (as indicated by the chain double-dashed line in FIG. 1).

Therefore, it is possible to move the lost motion connector 38 without changing the extent to which the wire rope 34 is paid out from the driving means 41. The slider 24 is moved together with the lost motion connector 38.

A lost motion piece 86 is fixed to the wire rope 34 such as to cooperate with a lost motion lever 88 which is axially supported by means of a pin 90 at one end of a limit switch 92.

A pair of extensions 94 of a small width which extend toward the pawl member 68 are integrally formed on the lost motion lever 88. The top ends of the extensions 94 contact the pawl member 68, with the pawl 70 thereof being interposed between the extensions 94. When the lost motion lever 88 turns about the pin 90 in the direction indicated by the arrow C in FIG. 3, the extensions 94 press the pawl member 68 against the urging force of the torsion coil spring 67 so that the pawl 70 of the pawl member 68 is moved out of the recess 72.

The lost motion lever 88 is turned due to the interference with the lost motion piece 86 when the wire rope 34 is moved toward the front of the vehicle.

The limit switch 92 has a contact shoe 92A which faces and contacts a projection 96A formed on a push dog 96. The contact shoe 92A is upwardly moved by the urging force of an urging means (not shown) (in the direction indicated by the arrow D in FIG. 3).

As the slider 24 is moved toward the rear of the vehicle, the head 30 of the slider 24 downwardly presses the contact shoe 92A by means of the push dog 96, thereby switching off the driving force of the driving means.

As shown in FIG. 4, the interference between the lost motion piece 86 and the lost motion lever 88 is in synchronism with the movement of the slider 24 effected by the pressing force of the lost motion connector 38.

That is, at the moment when the wire rope 34 starts to move toward the front of the vehicle, the ring 36 is in contact with the lost motion connector 38 (as indicated by the solid line in FIG. 4), and the lost motion piece 86 turns the lost motion lever 88 until the ring 37 starts to press the lost motion connector 38 (as indicated by the broken lines in FIG. 4).

Accordingly, when the lost motion connector 38 starts to move the slider 24, the pawl 70 moves out of the recess 72, thereby eliminating any influence upon the movement of the slider 24.

The operation of the embodiment of the present invention will be described below.

When the occupant 46 enters the vehicle, the slider 24 is disposed at the end of the guide rail 16 near the front of the vehicle, and a space is formed between the webbing 27 and the seat 44 so that the occupant 46 can easily seat himself on the seat 44.

After the occupant 46 is seated, the driving means (not shown) rotates in the counterclockwise direction so as to cause a tensile force in the wire rope 34, and the slider 24 is moved along the guide rail 16 toward the rear of the vehicle by the pressing force applied to the lost motion connector 38 by the ring 36.

As the wire rope 34 moves, the lost motion piece 86 is first brought into contact with the lost motion lever 88, thereby turning the same in the counterclockwise direction as viewed in FIG. 3 (in the direction indicated by the arrow C in FIG. 3).

This turning movement of the lost motion lever 88 causes the extensions 94 to turn the pawl member 68 about the pin 66 against the urging force of the torsion coil spring 67 in the direction indicated by the arrow A in FIG. 3.

While this state is maintained, the lower end of the head 30 of the slider 24 passes over the pawl member 68 without interfering with the same.

The holder 54 is disposed at the end of the guide rail 16 nearer to the rear of the vehicle, and the holder 54 is fixed by fitting the lock pin 76 into a desired pair of the circular holes 50 and 52.

When the slider 24 moves to the holder 54 which has the limit switch 92, the lower end of the head 30 of the slider 24 contacts the push dog 96, and the projection 96A of the push dog 96 presses down the contact shoe 92A of the limit switch 92 so as to terminate the driving operation of the driving means, thereby suitably applying the webbing around the occupant 46.

At this time, the lost motion piece 86 is parted from the lost motion lever 88, and the pawl member 68 is released from the state in which the pawl member 68 is pressed by the lost motion lever 88.

Then the torsion coil spring 67 urges the pawl member 68 to make the same turn about the pin 66 in the direction indicated by the arrow A in FIG. 3, so that the pawl 70 enters the recess 72 of the slider 24.

When in this state an emergency occurs, the acceleration sensor senses it, and the inertia lock mechanism operates so as to instantly preventing the webbing 27 from being paid out from the webbing retracter 28.

The occupant 46 is thereby restrained. At this time, a load generated by the inertial force of the occupant is applied to the slider 24 via the webbing 27, but this load is positively transmitted from the head 30 of the slider 24 via the reinforcement member 48 to the body of the vehicle.

Even should the vehicle turn over a load be applied to the slider 24 such as to move the same along the guide rail 16 toward the front of the vehicle, the slider 24 does not move and the load is positively transmitted to the body of the vehicle since the pawl 70 of the pawl member 68 is engaged with the recess 72 of the slider 24.

If an occupant having a physique which differs from that of the previous occupant takes the seat, the lock pin 76 is inserted in one of the other pairs of circular holes 50 and 52, thereby changing the position at which the slider 24 is stopped.

This operation is effected as described below. The knob 82 is first pulled against the urging force of the compression coil spring 84 (in the direction reverse to that indicated by the arrow B in FIG. 3).

The lock pin 76 is thereby removed from the circular holes 50 and 52, and the holder 54 becomes slidable so that the lock pin 76 can be easily positioned such as to face a suitable pair of circular holes 50 and 52.

When the knob 82 is released from the pulled state after the lock pin 76 has been positioned to coincide with the suitable circular holes 50 and 52, the lock pin 76 is inserted into these holes, thereby fixing the slider 24.

Since the wire guide tube 43 is bent to be changed from the linear state to the arched state or from the latter to the former, the slider 24 can be moved without changing the actual length of the wire rope 34 between the winding-up reel and the lost motion connector 38.

Thus the position at which the slider 24 is stopped can be changed in accordance with the physique of each occupant. It is therefore possible to ensure the most suitable application of the webbing for physique of widely different type.

In this embodiment, the holder 54 is easy to operate since it is made of a metal and has a comparatively small weight, and the load is not applied to the holder 54 since the lock pin 76 is directly fitted into the reinforcement member 48.

When the occupant gets out of the vehicle after the vehicle has stopped, the slider 24 is moved to the end of the guide rail 16 that is nearer to the front of the vehicle.

In this process, the driving means first starts to rotate in the normal direction so as to apply a compressive force to the wire rope 34 within the wire guide tube 43. The wire rope 34 thereby starts to move along the guide rail 16 toward the front of the vehicle. At this time, the lost motion piece 86 which moves together with the wire rope 34 contacts the lost motion lever 88, and the pawl 70 of the pawl member 68 is moved out of the recess 72.

This operation is effected until the ring 37 contacts the lost motion connector, and there is a slight lag before the slider 24 starts to move which is determined by the dimension W shown in FIG. 3. Thus the engagement between the pawl 70 and the recess 72 can be automatically released, thereby reducing the degree of complication of the operation.

In this embodiment, a wire rope is used as the elongated member, but a thin flexible tape may be used in place of the wire rope 34.

What is claimed is:

1. An automatic seat belt apparatus capable of automatically applying a webbing around an occupant of a vehicle, said automatic seat belt apparatus comprising:
   a guide rail disposed along the body of said vehicle;
   a slider capable of sliding by being guided along said guide rail, one end of said webbing being engaged with said slider;
   driving means for automatically applying said webbing to the occupant or removing said webbing from the occupant, one end of said driving means being connected to said slider so as to drive said sider along said guide rail;
   a limit switch for determining the stroke end of said slider in the vicinity of one end of said guide rail;
   a reinforcement member disposed in the vicinity of said end of said guide rail and fixed to said body of said vehicle, said reinforcement member accommodating said slider positioned at said stroke end;
   a holder adapted to cover the periphery of said reinforcement member, said holder being slidable along said reinforcement member, and said limit switch being mounted on said holder;
   adjusting means capable of determining the position of said holder at a plurality of points on said reinforcement member; and
   an anchor pin supported at its opposite ends on said holder to serve as a support member acting against the tensile force of said webbing applied to said slider, said anchor pin and said holder forming a closed cross-sectional configuration around said reinforcement member; wherein
   said anchor pin is moved by the operation of said adjusting means and constantly faces said slider at said stroke end, and wherein the tensile force of said webbing applied to said slider is positively transmitted to said reinforcement member by way of said holder.

2. An automatic seat belt apparatus according to claim 1, wherein said holder is formed by being bent from a plate and is disposed around said reinforcement member, and wherein the opposite ends of said anchor pin are fixed to the opposite ends of said holder, said anchor pin and said holder constituting a closed cross-sectional configuration.

3. An automatic seat belt apparatus according to claim 2, wherein said anchor pin is disposed such as to be nearer to the position of said occupant than said reinforcement member.

4. An automatic seat belt apparatus according to claim 1, wherein said anchor pin axially supports a pawl adapted for inhibiting said slider from moving toward the intermediate portion of said guide rail.

5. An automatic seat belt apparatus according to claim 4, wherein said pawl is urged in the direction in which said pawl is engaged with said slider.

6. An automatic seat belt apparatus according to claim 4, wherein said holder has a lever adapted for disengaging said pawl from said slider before said driving means starts to drive said slider at the initial stage of the driving operation of said diving means.

7. An automatic seat belt apparatus according to claim 1, wherein said driving means has an elongated flexible member whose one end is connected to said slider, and a motor for driving said elongated member at a portion thereof in the vicinity of the other end, and wherein one end of a covering member for guiding said elongated member is attached to said holder.

8. An automatic seat belt apparatus according to claim 1, wherein said adjusting means includes a through hole formed in said holder, a plurality of through holes formed in said reinforcement member, a lock pin which is inserted into said through hole of said holder and into one of said plurality of through holes of said reinforcement member.

9. An automatic seat belt apparatus according to claim 1, wherein said reinforcement member is provided in the form of a box for covering said guide rail.

10. An automatic seat belt apparatus in which a slider connected to a part of a webbing is slidably engaged and driven between the front and back ends of a guide rail formed along a vehicle so that said webbing is automatically secured around said occupant when said slider is driven to the back end of said guide rail, said automatic seat belt apparatus comprising:
   a reinforcement member adapted to cover a part of the back end of said guide rail and fixed to the body of said vehicle;
   a holder having opposing ends adapted to cover said reinforcement member and which is detachably connectable to said slider, said holder being releasably mountable along said reinforcement member at a selected position in the longitudinal direction thereof and including an anchor pin between said opposing ends for transmitting tensile forces applied to the slider from the webbing to the guide rail and the reinforcement member;

a limit switch attached to said holder and adapted for detecting when said slider arrives at the back end of said rail; and adjusting means for selecting the position that said holder detachably connects to said reinforcement member along the back end of said guide rail.

11. An automatic seat belt apparatus according to claim 10, wherein said holder has a generally U-shaped cross-sectional configuration and covers said reinforcement member.

12. An automatic seat belt apparatus according to claim 10, wherein said anchor pin is disposed such as to be nearer to the position of said occupant than said reinforcement member.

13. An automatic seat belt apparatus according to claim 11, wherein said anchor pin axially supports a pawl adapted for inhibiting said slider from moving toward the intermediate portion of said guide rail.

14. An automatic seat belt apparatus according to claim 13, wherein said pawl is urged in the direction in which said pawl is engaged with said slider.

15. An automatic seat belt apparatus according to claim 14, wherein said holder has a lever adapted for disengaging said pawl from said slider before said driving means starts to drive said slider at the initial stage of the driving operation of said diving means.

16. An automatic seat belt apparatus according to claim 10, wherein said adjusting means includes a through hole formed in said holder, a plurality of through holes formed in said reinforcement member, a lock pin which is inserted into said through hole of said holder and into one of said plurality of through holes of said reinforcement member.

17. An automatic seat belt apparatus which compulsorily applies a webbing around an occupant of a vehicle, said automatic seat belt apparatus comprising:

a guide rail disposed along the body of said vehicle;

a slider capable of sliding by being guided along said guide rail one end of said webbing being engaged with said slider;

driving means for automatically applying said webbing to the occupant or removing said webbing from the occupant, one end of said driving means being connected to said slider so as to drive the same along said guide rail;

a limit switch for determining the stroke end of said slider in the vicinity of one end of said guide rail;

a reinforcement member disposed in the vicinity of said end of said guide rail so as to cover the same, said reinforcement member being fixed to said body of said vehicle, and said reinforcement member accommodating said slider positioned at said stroke end;

a holder adapted to cover the periphery of said reinforcement member, said holder being slidable along said reinforcement member, and said limit switch being mounted on said holder;

adjusting means capable of determining the position of said holder at a plurality of points on said reinforcement member; and an anchor pin supported at its opposite ends on said holder to serve as a support member acting against the tensile force of said webbing caused at the time of an emergency, said anchor pin and said holder forming a closed cross-sectional configuration around said reinforcement member.

18. An automatic seat belt apparatus according to claim 17, wherein said anchor pin axially supports a pawl adapted for inhibiting said slider from moving toward the intermediate portion of said guide rail.

19. An automatic seat belt apparatus according to claim 18, wherein said pawl is urged in the direction in which said pawl is engaged with said slider.

20. An automatic seat belt apparatus according to claim 19, wherein said holder has a lever adapted for disengaging said pawl from said slider before said driving means starts to drive said slider at the initial stage of the driving operation of said driving means.

21. An automatic seat belt apparatus in which a slider connected to a portion of a webbing is slidably engaged and driven between the front and back ends of a guide rail formed along a vehicle so that said webbing is automatically secured around said occupant when said slider is driven to the back end of said guide rail, said automatic seat belt apparatus comprising:

a reinforcement member adapted to cover a part of the back end of said guide rail and fixed to the body of said vehicle;

a holder adapted to cover said reinforcement member which is detachably connectable to said slider, said holder being releasably mountable along said reinforcement member at a selected position in the longitudinal direction thereof and including an anchor pin receivable through both the guide rail and the reinforcement member for transmitting tensile forces applied to the slider from the webbing to the guide rail and the reinforcement member and thence to the body of the vehicle;

a limit switch attached to said holder and adapted for detecting when said slider arrives at the back end of said rail; and adjusting means for selecting the position that said holder detachably connects to said slider along the back end of said guide rail.

* * * * *